United States Patent

Miller et al.

[15] 3,699,422
[45] Oct. 17, 1972

[54] AUTOMATIC BATTERY CHARGER
[72] Inventors: Robert L. Miller, Horsham; David H. Higgins, Abington, both of Pa.
[73] Assignee: Honeywell Inc., Minneapolis, Minn.
[22] Filed: Feb. 11, 1972
[21] Appl. No.: 225,452

[52] U.S. Cl. ..........................320/32, 320/23, 320/39
[51] Int. Cl. ...............................................H02j 7/02
[58] Field of Search..........320/20, 21, 22, 23, 31, 32, 320/39, 40, DIG. 1

[56] References Cited

UNITED STATES PATENTS

| | | | |
|---|---|---|---|
| 3,517,295 | 6/1970 | Lapuyade | 320/39 X |
| 3,553,561 | 1/1971 | Lesher | 320/39 X |

*Primary Examiner*—J. D. Miller
*Assistant Examiner*—Robert J. Hickey
*Attorney*—Arthur H. Swanson

[57] ABSTRACT

A battery charging circuit includes a first voltage divider means connected across a source of DC potential. An impedance element connects the first voltage divider to an input terminal of an first operational amplifier. Another input terminal of the first operational amplifier is connected to a second voltage divider which is connected across a series combination of a resistor and a battery to be charged. The output terminal of the first operational amplifier is connected to a current regulating device for controlling the magnitude of a charging current flowing from the DC source to a battery. When the terminal voltage of the battery is below a predetermined value, the first operational amplifier effects the flowing of the charging current of a first magnitude, sufficient to rapidly charge the battery through the current regulating device. A second operational amplifier has one input terminal connected to the point between the resistor and the battery, and its other input terminal connected to a third voltage divider. The third voltage divider is connected in parallel with the second voltage divider. The output of the second operational amplifier controls a transistor which is connected to the impedance element. When the battery charging current falls below a predetermined value, the second operational amplifier effects conduction in the transistor which, in turn, effects a change in the signal applied to the first operational amplifier from the impedance element. That change, in turn, causes the magnitude of the charging current to be reduced to a value sufficient only to substantially maintain the battery in its acquired state of charge. Thereafter, when the battery terminal voltage decreases below a predetermined value, the second operational amplifier provides an output signal which is effective to return the transistor to its initial nonconducting state whereby the first operational amplifier again effects the flow of the charging current of the first magnitude through the current regulating device, and the battery is again rapidly charged, but not overcharged.

8 Claims, 1 Drawing Figure

PATENTED OCT 17 1972  3,699,422
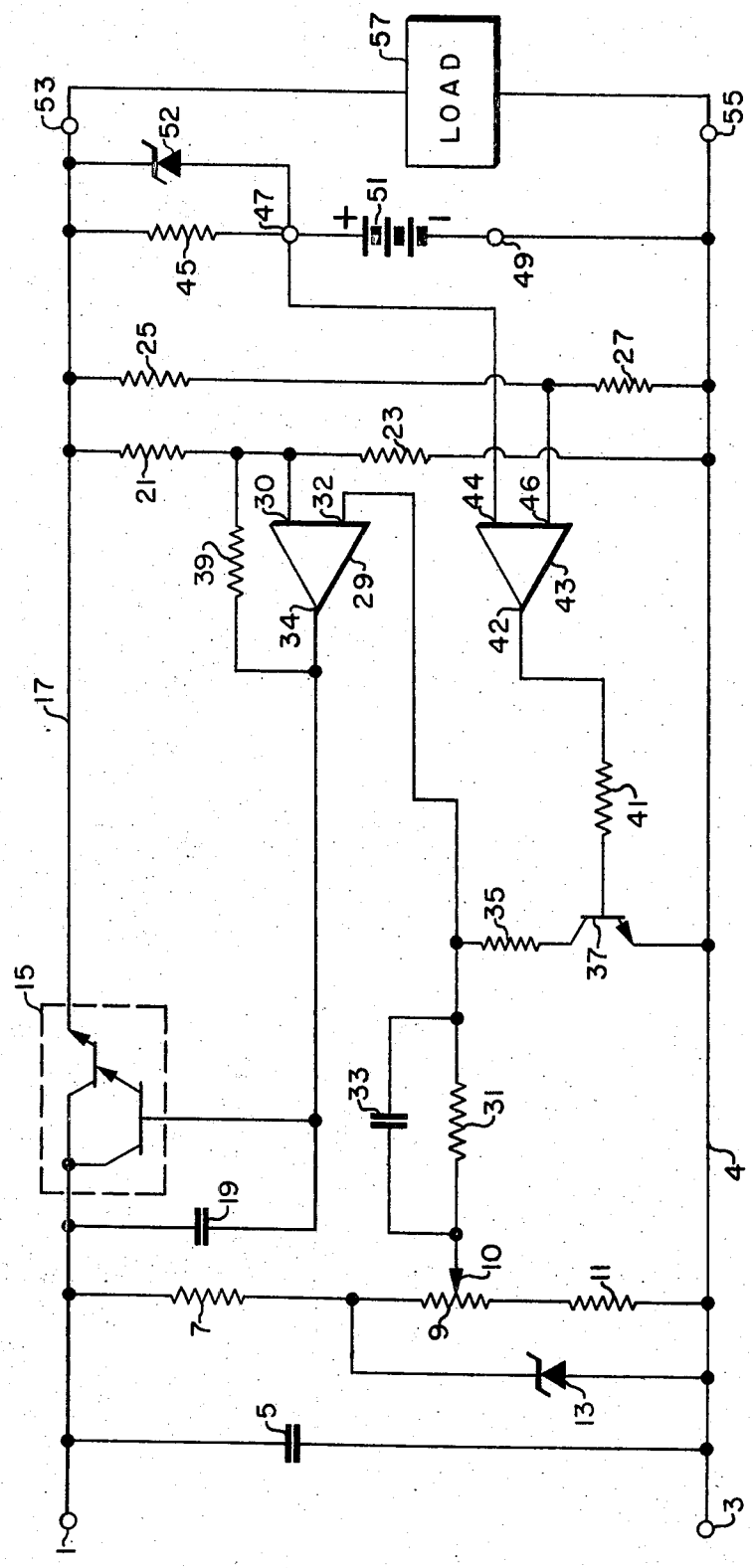

AUTOMATIC BATTERY CHARGER

The present invention relates generally to battery charging circuits and more particularly to an improved battery charging circuit which utilizes the magnitude of the charging current as a measure of the state of charge of the battery.

In the past, battery charging circuits have been provided which charge a battery at a rapid rate with a relatively high magnitude charging current, and automatically switch to a smaller magnitude charging current when the battery has become charged. The smaller charging current is desired after the battery has been charged, in order to prevent the ill effects of overcharging a battery, such as over-heating and gassing. Those circuits have generally utilized the terminal voltage of a connected battery as a criterion for both, initially turning on the battery charging circuit, and subsequently, reducing the charging current. While the battery terminal voltage provides an acceptable criterion for turning on a charging circuit, it is not particularly the most advantageous measure for determining when the connected battery has attained a fully charged state. The main disadvantage in using battery terminal voltage to indicate when the battery is charged is that it usually represents a larger value of charge than that actually delivered to the battery cells. For that reason, circuits using battery terminal voltage as a measure of battery charge have had the disadvantage of inefficient operation in that the charging current is either shut off or reduced before the battery is actually fully charged. Further, prior art battery charging circuits have tended to be unduly complicated in design and construction.

It is, accordingly, an object of the present invention to obviate the disadvantages of the prior art apparatus.

It is another object of the present invention to provide an improved battery charging circuit which more accurately determines when a battery has been fully charged.

It is a further object of the present invention to provide an improved battery charging circuit as set forth, which is simple in design and construction.

In accomplishing these and other objects, there has been provided, in accordance with the present invention, an improved battery charging circuit which includes a first comparator means for controlling a current regulating device which, in turn, controls the magnitude of charging current supplied to a battery to be charged. The first comparator means is initially responsive to the difference between a first control signal, which initially reflects a predetermined reference value, and a second control signal, representative of the terminal voltage of the battery, for effecting conduction through the regulating device, thereby providing a charging current of a first magnitude for rapidly charging the battery when the battery terminal voltage is below a predetermined value. Thereafter, a second operational amplifier responds to the difference between a third control signal and a signal representative of the charging current supplied to the battery, for effecting a change in the value of the first control signal when the charging current is reduced below a predetermined value. The change in the first control signal value is effective to cause the first operational amplifier to change its output signal thereby effecting a reduction in the magnitude of the charging current. The reduced charging current is sufficient only to substantially maintain the battery at the acquired state of charge under no load conditions. Thereafter, the second operational amplifier responds to a decrease in the battery terminal voltage, which may be caused by a load drain, to restore the first control signal to its original value whereby the battery is again charged at a rapid rate.

A better understanding of the present invention may be had from the following detailed description, when read in connection with the accompanying drawing, in which the single FIGURE is a schematic diagram of one embodiment of the present invention.

Referring to the drawing in detail, a source terminal means, comprising a first source terminal 1 and a second source terminal 3, is arranged for connection to a source of D.C. potential. A common bus 4 is connected to the second source terminal 3. A capacitor 5 is connected between the source terminals 1 and 3. A first voltage divider, comprising three resistors 7, 9, and 11, is also connected across the source terminals 1 and 3, respectively. The first voltage divider has a pick off terminal 10 thereon. The anode to cathode path of a zener diode 13 connects the second source terminal 3 to a point on the first voltage divider between the resistor 7 and the resistor 9. A regulating device, or Darlington pair, 15 has its collector terminal connected to the first source terminal 1 and its emitter terminal connected to a regulated bus 17. A capacitor 19 connects the collector terminal of the Darlington pair 15 with its base terminal. A second voltage divider, comprising resistors 21 and 23, is connected between the regulated bus 17 and the common bus 4, and provides a second control signal at the junction of the two resistors 21 and 23. A third voltage divider, comprising resistors 25 and 27 is connected in parallel with the second voltage divider and provides a third control signal at the common point connecting the resistors 25 and 27. A first operational amplifier, or first comparator means, has a first input terminal 30 thereof connected to the point between resistor 21 and resistor 23, and a second input terminal 32 connected through an impedance element, including a capacitor 33 in parallel with a resistor 31, to the pick off terminal 10 of the first voltage divider. The first voltage divider, including resistors 7, 9, and 11, together with the impedance element, including the resistor 31 and the capacitor 33, comprise a first control signal generating means for providing a first control signal. A shunt path from the terminal 32 to the bus 4 is provided through a resistor 35 and the emitter-collector path of a switching means or transistor 37. A feedback resistor 39 is connected between the first input terminal 30 of the first operational amplifier 29 and an output terminal 34 thereof. The output terminal 34 of the first operational amplifier 29 is also connected to the base terminal of the current regulating Darlington pair 15. The base terminal of the transistor 37 is connected through a resistor 41 to an output terminal 42 of a second operational amplifier, or comparator means, 43. A resistor 45 connects the regulated bus 17 with the positive side of a battery 51. The negative side of the battery 51 is connected to the common bus 4. A first input terminal 44 of the second operational amplifier 43 is connected to the positive terminal of the battery 51 and a second input terminal 46 of the second operational amplifier 43 is connected to the junction between the resistors 25 and 27 of the third voltage divider. The anode to cathode path of a diode 52 connects the positive terminal of the battery 51 with the regulated bus 17 which, in turn, is connected to a first load terminal 53. The second source terminal 3 of the circuit is connected by the common bus 4 to a second load terminal 55. A load 57 is shown connected between the load terminals 53 and 55.

In operation, the Darlington pair or current regulating device 15, and the switching means or transistor 37 may be considered as initially nonconducting. When a DC potential is applied to the source terminals 1 and 3, a reference potential appears at the slider arm of the resistor 9. That reference potential is coupled through the capacitor 33 to the input terminal 32 of the first comparator means 29. The combination of the first voltage divider, the resistor 31 and the capacitor 33, functions as a first control signal generating means which applies a first control signal to the first comparator means 29. The value of the first control signal will be dependent upon the state of conduction of the transistor or switching means 37 as is hereinafter explained. The second control signal generating means, the voltage divider comprised of resistors 21 and 23, applies a second control signal to the input terminal 30 of the first comparator means 29. Since the Darlington pair 15 is initially not conducting, the second control signal is initially representative of and proportional to the terminal voltage on the battery 51. If the terminal voltage on the battery 51 is below a predetermined value, indicative of the battery 51 being undercharged, the relationship between the first and second control signals will be such that the first comparator means 29 will generate an output signal, which, when applied to the regulating device 15, initiates a high state of conduction therethrough, thereby providing a charging current of a first magnitude, effective to rapidly charge the battery 51. As the battery 51 becomes charged, the charging current is reduced and the voltage appearing at the terminal 47 will increase toward the voltage present on the regulated bus 17 since a decreasing charging current will precipitate a decreasing potential difference across the resistor 45. The resistor 45 therefore performs the function of measuring the charging current. After the charging current has decreased below a predetermined value indicative of the battery being fully charged, the relationship between the third control signal and the charging signal or signal present at the terminal 47, will be such that the second comparator means 43 will generate a switching signal which is applied to the base terminal of the transistor 37 to render that transistor conductive. When the transistor 37 is conductive, a current is drawn through the circuit comprising the resistor 31, the resistor 35, and the collector to emitter path of the transistor 37. That current effects a reduction in the first control signal, the reduction being equal to the potential drop across the resistor 31. The decreased first control signal, when applied to the input terminal 32 of the first comparator means 29, is effective to reduce the output signal of the first comparator means 29. That reduced output signal is applied to the current regulating device 15 which, in turn, effects a reduction in the charging current to a second, relatively lower magnitude. The reduced charging current is sufficient only to substantially maintain the battery 51 in its acquired state of charge under no load conditions. Thereafter, should the charge on the battery 51 become depleted, or significantly reduced from supplying a load 57 for example, the voltage appearing at the positive terminal 47 of the battery will decrease. When the voltage appearing at the terminal 47 decreases, the difference signal applied to the second comparator means 43 will also decrease. When the voltage appearing at the positive terminal of the battery 51 decreases below a predetermined value, which is determined by the division ratio of the third voltage divider, the signal generated by the second comparator means 43 will be reduced to a level below that needed to maintain conduction in the switching means or transistor 37. The transistor 37 will then cease conducting and the current flow through the resistor 31 will terminate. The first control signal will then return to its relatively higher value as determined by the position of the slider on the resistor 9. When the first control signal is increased, the difference between the signals applied to the first comparator means 29 is also increased, and the output signal of the first comparator means 29 will increase accordingly. When the increased output signal of the first comparator means 29 is applied to the current regulating device 15, the current regulating device 15 returns to its high conduction state whereby the charging current rapidly charges the battery 51. The combination including the second comparator means 43 and the switching means or transistor 37, functions as a control means which is responsive to the relationship between the charging signal, i.e., the potential at point 47, and the third control signal, i.e., the potential at the point between the resistors 25 and 27 of the third voltage divider, for altering the relationship between the first and second control signals whereby to vary the charging rate of the battery 51 in accordance with the magnitude of the charging current delivered thereto.

Thus, there has been provided an improved battery charging circuit which is simple in design and construction, and which more accurately determines when a battery has attained a full charge, in order to more efficiently charge the battery by avoiding the premature termination of a supplied charging current before the battery has attained a full charge.

The embodiments of the invention in which an exclusive property or privilege is claimed are defined as follows:

1. In a battery charging circuit wherein a regulation device regulates a charging current flow from a DC source to a battery to be charged, the combination comprising:
   a first control signal generating means arranged for connection across the DC source for providing a first control signal;
   charging current measuring means connected between the regulation device and the battery for providing a charging signal representative of the charging current supplied to the battery;
   second control signal generating means connected across said charging current measuring means and the battery for providing a second control signal;

first comparator means responsive to said first and second control signals for controlling the regulation device, said first comparator means being responsive to a first predetermined relationship between said first and second control signals for effecting a flow of charging current of a first magnitude through said regulation device, and a second predetermined relationship between said first and second control signals for effecting the flow of charging current of a second magnitude through said regulation device;

third control signal generating means connected across the battery and said charging current measuring means for generating a third control signal; and control means connected to said first control signal generating means, said control means being responsive to a first predetermined relationship between said charging signal and said third control signal for changing the value of said first control signal whereby to affect the relationship between said first and second control signals.

2. The combination as set forth in claim 1 wherein said charging current measuring means is a resistor.

3. The combination as set forth in claim 1 wherein said first control signal generating means includes:

a voltage divider means having a pick off terminal thereon, said voltage divider means being arranged for connection across the DC source; and an impedance means connecting said pick off terminal with said first comparator means.

4. The combination as set forth in claim 3 wherein said impedance means includes a resistor.

5. The combination as set forth in claim 4 wherein said impedance means includes a capacitor connected in parallel with said resistor.

6. The combination as set forth in claim 4 wherein said second and third control signal generating means each comprises voltage divider means having pick off terminals thereon for providing said second and third control signals, respectively.

7. The invention as set forth in claim 3 wherein said control means comprises:

second comparator means responsive to said first predetermined relationship between said charging current and said third control signal for providing a switching signal; and switching means connecting said impedance means with said second source terminal, said switching means being responsive to said switching signal for providing an effective contact closure between said impedance means and said second source terminal.

8. The invention as set forth in claim 7 wherein said switching means is a transistor.

* * * * *